(12) United States Patent
Pala et al.

(10) Patent No.: US 12,200,122 B1
(45) Date of Patent: Jan. 14, 2025

(54) SYSTEMS AND METHODS FOR ADVANCED QUANTUM-SAFE PKI CREDENTIALS FOR AUTHENTICATIONS

(71) Applicant: CABLE TELEVISION LABORATORIES, INC., Louisville, CO (US)

(72) Inventors: Massimiliano Pala, Superior, CO (US); Bernardo Huberman, Palo Alto, CA (US); Jing Wang, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 137 days.

(21) Appl. No.: 17/396,089

(22) Filed: Aug. 6, 2021

Related U.S. Application Data

(60) Provisional application No. 63/062,228, filed on Aug. 6, 2020.

(51) Int. Cl.
*H04L 9/08* (2006.01)
*H04L 9/32* (2006.01)
*H04L 9/40* (2022.01)

(52) U.S. Cl.
CPC .......... *H04L 9/0891* (2013.01); *H04L 9/3242* (2013.01); *H04L 9/3268* (2013.01); *H04L 63/062* (2013.01)

(58) Field of Classification Search
CPC ... H04L 9/0891; H04L 9/3242; H04L 9/3268; H04L 63/062
See application file for complete search history.

(56) References Cited

U.S. PATENT DOCUMENTS 6,931,537 B1    8/2005    Takura et al.
8,001,381 B2    8/2011    Metke et al.
(Continued)

FOREIGN PATENT DOCUMENTS

CA      3154434 A1    4/2021
CN    104660602 A    5/2015
(Continued)

OTHER PUBLICATIONS

The Internet Engineering Task Force (IETF)—IETF RFC 5280. Internet X.509 Public Key Infrastructure Certificate and Certificate Revocation List (CRL) Profile, edited by W. Polk et al., May 2008. Also available at https://datatracker.ietf.org/doc/rfc5280/.
(Continued)

*Primary Examiner* — Techane Gergiso
(74) *Attorney, Agent, or Firm* — Armstrong Teasdale LLP (57) ABSTRACT

A server device is provided for authenticating client devices on a communication network. The server device includes a transceiver configured for operable communication with at least one client of the communication network, and a processor including a memory configured to store computer-executable instructions. When executed by the processor, the instructions cause the server device to receive an authentication request from a client device, generate a seed for a first key for the client device if the client device authenticates, transmit the seed for the first key to the client device, receive a hash of the first key from the client device, and validate the first key based on the hash of the first key.

20 Claims, 5 Drawing Sheets

(56) References Cited

U.S. PATENT DOCUMENTS

| | | | |
|---|---|---|---|
| 8,855,316 B2* | 10/2014 | Wiseman | H04L 9/0855 380/278 |
| 9,912,486 B1 | 3/2018 | Sharifi Mehr | |
| 10,205,595 B2 | 2/2019 | Frascadore | |
| 10,250,590 B2 | 4/2019 | Gryb et al. | |
| 10,454,904 B2 | 10/2019 | Huh et al. | |
| 10,615,969 B1* | 4/2020 | Griffin | H04L 9/0825 |
| 11,115,217 B2 | 9/2021 | Shekh-Yusef et al. | |
| 11,171,964 B1 | 11/2021 | Huang et al. | |
| 11,218,301 B1* | 1/2022 | Shea | H04L 9/0827 |
| 11,405,789 B1 | 8/2022 | Wei et al. | |
| 11,456,867 B2* | 9/2022 | Schmatz | H04L 9/0891 |
| 11,552,806 B2 | 1/2023 | Pala | |
| 11,582,031 B2 | 2/2023 | Wang et al. | |
| 11,599,862 B1 | 3/2023 | Hecht et al. | |
| 11,616,645 B1 | 3/2023 | Wang et al. | |
| 12,028,324 B1 | 7/2024 | Pala | |
| 2002/0199001 A1 | 12/2002 | Wenocur et al. | |
| 2003/0172269 A1 | 9/2003 | Newcombe | |
| 2006/0136714 A1 | 6/2006 | Yagi et al. | |
| 2006/0222180 A1 | 10/2006 | Elliott | |
| 2008/0031459 A1 | 2/2008 | Voltz et al. | |
| 2009/0016736 A1 | 1/2009 | Beal et al. | |
| 2009/0031141 A1 | 1/2009 | Pearson et al. | |
| 2009/0163176 A1 | 6/2009 | Hasegawa | |
| 2009/0316910 A1 | 12/2009 | Maeda et al. | |
| 2010/0049975 A1 | 2/2010 | Parno et al. | |
| 2010/0161817 A1 | 6/2010 | Xiao et al. | |
| 2011/0010547 A1 | 1/2011 | Noda | |
| 2011/0126011 A1* | 5/2011 | Choi | H04L 9/0852 713/168 |
| 2012/0177201 A1* | 7/2012 | Ayling | H04L 9/0858 380/278 |
| 2012/0272056 A1* | 10/2012 | Ganesan | H04L 9/3215 380/283 |
| 2013/0083926 A1* | 4/2013 | Hughes | H04L 9/3247 380/278 |
| 2013/0251145 A1* | 9/2013 | Lowans | H04L 9/0891 380/44 |
| 2013/0310006 A1 | 11/2013 | Chen et al. | |
| 2013/0318343 A1 | 11/2013 | Bjarnason et al. | |
| 2014/0014715 A1 | 1/2014 | Moran et al. | |
| 2014/0289520 A1 | 9/2014 | Tanizawa et al. | |
| 2015/0288517 A1* | 10/2015 | Evans | H04L 9/0852 713/168 |
| 2015/0310221 A1 | 10/2015 | Lietz et al. | |
| 2016/0248586 A1* | 8/2016 | Hughes | H04L 9/0852 |
| 2017/0034133 A1 | 2/2017 | Korondi et al. | |
| 2017/0063827 A1* | 3/2017 | Ricardo | H04L 63/083 |
| 2017/0063834 A1 | 3/2017 | Gryb et al. | |
| 2017/0149568 A1 | 5/2017 | LaGrone et al. | |
| 2017/0214525 A1 | 7/2017 | Zhao et al. | |
| 2017/0338951 A1* | 11/2017 | Fu | H04L 9/0894 |
| 2017/0338952 A1* | 11/2017 | Hong | H04L 9/083 |
| 2018/0026982 A1 | 1/2018 | Wei | |
| 2018/0041497 A1 | 2/2018 | Morishita et al. | |
| 2018/0062842 A1* | 3/2018 | Arahira | H04L 9/30 |
| 2018/0097640 A1 | 4/2018 | Queralt et al. | |
| 2018/0109378 A1* | 4/2018 | Fu | H04L 9/0897 |
| 2018/0212779 A1* | 7/2018 | Bergmann | H04L 9/0869 |
| 2018/0262243 A1 | 9/2018 | Ashrafi et al. | |
| 2018/0262504 A1 | 9/2018 | Frederick et al. | |
| 2019/0020641 A1 | 1/2019 | Wasily et al. | |
| 2019/0036688 A1 | 1/2019 | Wasily et al. | |
| 2019/0036914 A1* | 1/2019 | Tzur-David | H04L 9/0861 |
| 2019/0123901 A1 | 4/2019 | Vijayanarayanan | |
| 2019/0245690 A1 | 8/2019 | Shah et al. | |
| 2019/0319804 A1* | 10/2019 | Mathew | G09C 1/00 |
| 2019/0373471 A1 | 12/2019 | Li et al. | |
| 2020/0280549 A1* | 9/2020 | Kaliski, Jr. | H04L 9/0822 |
| 2021/0044433 A1* | 2/2021 | Hay | H04L 9/0855 |
| 2021/0044976 A1 | 2/2021 | Avetisov et al. | |
| 2021/0099292 A1 | 4/2021 | Gilton et al. | |
| 2021/0119788 A1 | 4/2021 | Wang | |
| 2022/0006835 A1* | 1/2022 | Gray | H04L 9/085 |
| 2022/0094675 A1 | 3/2022 | Madisetti et al. | |
| 2022/0231843 A1* | 7/2022 | Garcia Morchon | H04L 9/3093 |
| 2023/0014894 A1* | 1/2023 | M M | H04L 9/30 |
| 2023/0020193 A1* | 1/2023 | Williams | H04L 9/0877 |
| 2023/0206198 A1 | 6/2023 | Hecht et al. | |

FOREIGN PATENT DOCUMENTS

| | | | | |
|---|---|---|---|---|
| CN | 107204812 A | | 9/2017 | |
| CN | 107404461 A | * | 11/2017 | G06F 21/10 |
| CN | 114631049 A | | 4/2022 | |
| EP | 1927209 A1 | | 6/2008 | |
| EP | 2164189 A1 | | 3/2010 | |
| EP | 3432509 A1 | | 1/2019 | |
| JP | 2007288694 A | | 11/2007 | |
| JP | 2012080229 A | | 4/2012 | |
| WO | 2011134507 A1 | | 11/2011 | |
| WO | 2016073552 A1 | | 5/2016 | |

OTHER PUBLICATIONS

Aes16: Markus Grassl, Brandon Langenberg, Martin Roetteler, and Rainer Stein-wandt. Applying Grover's Algorithm to AES: Quantum Resource Estimates. In PQCrypto, vol. 9606 of Lecture Notes in Computer Science, pp. 29-43. Springer, Year: 2016.

Aes20: Xavier Bonnetain, María Naya-Plasencia and André Schrottenloher. Quantum Security Analysis of AES. IACR Transactions on Symmetric Cryptology vol. 0, No. 0, pp. 1-3, Year: 2020.

Amaral Gustavo C., et al.: "WDM-PON Monitoring with Tunable Photon Counting OTDR," IEEE Photonics Technology Letters, IEEE, USA, vol. 26, No. 13, Jul. 1, 2014 (Jul. 1, 2014), pp. 1279-1282, XOP011550969, ISSN: 1041-1135, DOI: 10.1109/LPT. 2014.2320871 [retrieved on Jun. 10, 2014] *abstract*.

Burstinghaus-Steinbach, K., Kraus, C., Niederhagen, R., and Schneider, M., 2020, October. Post-quantum TLS on embedded systems: Integrating and evaluating kyber and sphincs+ with mbed tls. In Proceedings of the 15th ACM Asia Conference on Computer and Communications Security (pp. 841-852). (Year: 2020).

Chen et al.; Metropolitan all-pass and inter-city quantum communication network; Dec. 2010; Optical society of America; pp. 1-9. (Year: 2010).

Choi, P. S. et al.: "Quantum key distribution on a 10Gb/s WDM-PON," Optical Fiber Communication (OFC), Collocated National Fiber Optic Engineers Conference, 2010 Conference on (OFC/NFOEC), IEEE, Piscataway, NJ, USA, Mar. 21, 2010 (Mar. 21, 2010), pp. 1-3, XP03167683.

Com20: M. Pala. Composite Public Keys and Signatures, IETF I-D 03. Feb. 5, 2019.

Doc31: Data-Over-Cable Service Interface Specifications, DOCSIS 3.1, Security Specifications. CableLabs Publication, 2020. Available as CM-SP-SECv3.1-IO9-200407; Year: 2020.

Doc40: Data-Over-Cable Service Interface Specifications, DOCSIS 4.0, Security Specifications. CableLabs Publication, 2019. Available as CM-SP-SECv4.0-IO1-190815; Year: 2019.

Dr99: Joan Daemen and Vincent Rijmen. AES proposal: Rijndael, Year: 1999.

Elboukhari, Mohamed et al. "Integration of Quantum Key Distribution in the TLS Protocol." IJCSNS International Journal of Computer Science and Network Security, vol. 9. No. 12, (2009).

Fatima et al., X.509 and PGP Public Key Infrastructure Methods: A Critical Review, 2015, IFCSNS International Journal of Computer Science and Network Security, vol. 15, No. 5: pp. 55-59 (Year: 2015).

Gro96: Lov K. Grover. A Fast Quantum Mechanical Algorithm for Database Search. In Gary L. Miller, editor, Proceedings of the Twenty-Eighth Annual ACM Symposium on the Theory of Computing, Philadelphia, Pennsylvania, USA, May 22-24, 1996, pp. 212-219, ACM, Year: 1996.

Harn, L., and Rn, J., 2011. Generalized digital certificate for user authentication and key establishment for secure communications. IEEE Transactions on Wireless Communications, 10(7), pp. 2372-2379 (Year: 2011).

(56) References Cited

OTHER PUBLICATIONS

International Search Report is corresponding application PCTUS2056172 (Mar. 3, 2021).
ITU509: ITU-T Recommendation X.509 (2005) | ISO/IEC 9594-8:2005, Information Technology—Open Systems Interconnection—The Directory: Public-key and attribute certificate frameworks; Year: 2005.
Kumavor P. D., et al.: "Comparison of Four Multi-User Quantum Key Distribution Schemes Over Passive Optical Networks," Journal of Lightwave Technology, IEEE, USA, vol. 23, No. 1, Jan. 1, 2005 (Jan. 1, 2005), p. 168- j276, XP001227328, ISSN: 0733-8724, DOI: 10.1109/JLT.2004.834481 *abstract*.
Luo et al.; Time Synchronization over Ethernet Passive Optical Networks; Oct. 2012; IEEE; pp. 1-7 (Year: 2012).
M. Bagnulo. "Stateful NAT64: Network Address Protocol Translation from IPV6 Clients o IPv4 Servers" Internet Engineering Task For (IETF), ISSN: 2070-1721, p. 10/39, Apr. 2011 (Year: 2011).
Ntru10: American National Standards Institute (2010) Ansi X9.98-2010—Lattice-Based Polynomial Public Key Establishment Algorithm for the Financial Services Industry (ANSI, New York City, United States), available at https://webstore.ansi.org/standards/ascx9/ansix9982010r2017; Year: 2010.
Ntru9: Institute of Electrical and Electronics Engineers (2009) IEEE Standard1363.Jan. 2008—Specification for Public Key Cryptographic Techniques Based on Hard Problems over Lattices (IEEE, Piscataway, New Jersey, United States), Available at https://doi.org/10.1109/IEEESTD.2009.4800404; Year: 2009.
Paquin, C., Stebila, D. and Tamvada, G., 2020. Benchmarking post-quantum cryptography in TLS. In Post-Quantum Cryptography; 11th International Conference, PQCrypto 2020, Paris, France, Apr. 15-17, 2020, Proceedings 11 (pp. 72-91), Springer International Publishing (Year: 2020).
PKCS11: Oasis Standard, S. Gleeson and C. Zimman, PKCS #11 Cryptographic Token Interface Base Specification, Version 2.40, Apr. 2015.
RFC 2986: IETF 2986, M. Nystrom, et al., PKCS #10: Certification Request Syntax Specification, Version 1.7, Nov. 2000.
RFC 3279: IETF RFC 3279, W. Polk, et al., Algorithms and Identifiers for the Internet X.509 Public Key Infrastructure Certificate and Certificate Revocation List (CRL) Profile, Apr. 2002.
RFC 5272: IETF RFC 5272, J. Schaad, et al., Certificate Management over CMS (CMC), Jun. 2008.
RFC 5273: IETF RFC 5273, J. Schaad, et al., Certificate Management over CMS (CMC): Transport Protocols, Jun. 2008.
RFC 5280: IETF RFC 5280, W. Polk, et al., Cryptographic Message Syntax (CMS), May 2008.
RFC 5652: IETF RFC 5652, R. Housley, Cryptographic Message Syntax (CMS), Sep. 2009.
RFC 5758: IETF RFC 5758, Q. Dang, et al., Internet X.509 Public Key Infrastructure: Additional Algorithms and Identifiers for DSA and ECDSA, Jan. 2010.
RFC 5869: IETF RFC 5869, H. Krawczyk and P. Eronen, HMAC-based Extract-and-Expand Key Derivation Function (HKDF), May 2010.
RFC 6402: IETF RFC 6402, J. Schaad, Certificate Management over CMS (CMC) Updates, Nov. 2011.
RFC 6818: IETF RFC 6818, P. Yee, Updates to the Internet X.509 Public Key Infrastructure Certificate and Certificate Revocation List (CRL) Profile, Jan. 2013.
RFC 8446: IETF RFC 8446, E. Rescorla, et al., The Transport Layer Security (TLS) Protocol, Version 1.3, Aug. 2018.
RFC 8555: IETF RFC 8555, R. Barnes, et al., Automatic Certificate Management Environment (ACME), Mar. 2019.
RFC 8696: IETF RFC 8696, R. Housley, Using Pre-Shared Key (PSK) in the Cryptographic Message Syntax (CMS), Dec. 2019.
Rphy18: Data-Over-Cable Service Interface Specifications, DCA—MHAv2. Remote PHY Specification. Available as CM-SP-R-PHY-110-180509; Year.
Sun, Y., Zhang, R., Wang, X., Gao, K. and Liu L., 2018, July. A decentralizing attribute-based signature for healthcare blockchain. In 2018 27th International conference on computer communication and networks (ICCCN) (pp. 1-9) IEEE (Year: 2018).
The Internet Engineering Task Force (IETF)—IETF RFC 2986. PKCS#10: Certification Request Syntax Specification Version 1.7, edited by M. Nystrom et al., Nov. 2000, available at https://datatracker.ietf.org/doc/rfc2986/.

\* cited by examiner

SYSTEMS AND METHODS FOR ADVANCED QUANTUM-SAFE PKI CREDENTIALS FOR AUTHENTICATIONS

CROSS REFERENCE TO RELATED APPLICATIONS

This application claims the benefit of and priority to U.S. Provisional Application No. 63/062,228, filed Aug. 6, 2020, entitled "METHODS FOR QUANTUM-SAFE AUTHENTICATIONS AND PKI EVOLUTION," which are hereby incorporated by reference in their entirety.

BACKGROUND

The field of the invention relates generally to quantum-safe PKI credentials, and more specifically, to systems and methods for transitioning from a classic cryptography to a post-quantum cryptography.

Deploying real security is difficult and ever changing. Security engineers rely on cryptographic primitives to make sure protocols operate as intended and that data is accessed only by authorized entities. Deploying real security is even harder when uncertainty around the efficacy of even basic tools is at risk. Advancements in both traditional and quantum computing pose serious threats that may impact the possibility to provide secure access and data privacy not only for the broadband industry, but across the Internet.

Many current system offer no clear path forward as to how to deploy, transition, and support entities in a period of great uncertainty related to the security of proposed algorithms (both old or classic ones and new or quantum-resistant ones). Accordingly, a system for providing secure transitioning from classic cryptography to post-quantum cryptography would be advantageous.

SUMMARY

In an embodiment, a server device is provided for authenticating client devices on a communication network. The server device includes a transceiver configured for operable communication with at least one client of the communication network, and a processor including a memory configured to store computer-executable instructions. When executed by the processor, the instructions cause the server device to receive an authentication request from a client device. If the client device authenticates, the instructions further cause the server device to generate a seed for a first key for the client device. The instructions also cause the server device to transmit the seed for the first key to the client device. The instructions further cause the server device to receive a hash of the first key from the client device. In addition, the instructions cause the server device to validate the first key based on the hash of the first key.

In an embodiment, a server device is provided for facilitating communication between devices on a plurality of networks. The server device includes a transceiver configured for operable communication with at least one client of a first communication network and an external computer device of a second communication network, and a processor including a memory configured to store computer-executable instructions. When executed by the processor, the instructions cause the server device to receive an authentication request from a client device. The client device stores a first key. If the client device authenticates, the instructions cause the server device to determine an update to the first key. The instructions also cause the server device to transmit the update to the first key to the client device. The instructions further cause the server device to receive a hash of the updated first key from the client device. In addition, the instructions cause the server device to validate the updated first key based on the hash of the updated first key.

In an embodiment, a client device is provided for communicating on a communication network. The server device includes a transceiver configured for operable communication with at least one client of a first communication network and an external computer device of a second communication network, and a processor including a memory configured to store computer-executable instructions. When executed by the processor, the instructions cause the client device to transmit an authentication request to a server device. The instructions also cause the client device to receive a seed for a first key from the server device. The instructions further cause the client device to generate the first key based on the seed for the first key. In addition, the instructions cause the client device to store the first key. Moreover, the instructions cause the client device to generate a hash of the first key. Furthermore, the instructions cause the client device to transmit the hash of the first key for validation to the server device.

BRIEF DESCRIPTION OF THE FIGURES

These and other features, aspects, and advantages of the present disclosure will become better understood when the following detailed description is read with reference to the following accompanying drawings, in which like characters represent like parts throughout the drawings.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

The present embodiments relate generally to quantum-safe PKI credentials, and more specifically, to systems and methods for transitioning from a classic cryptography to a post-quantum cryptography. This disclosure provides a path to deploy, transition, and support entities in a period of great uncertainty related to the security of proposed algorithms (both old or classic ones and new or quantum-resistant ones). This disclosure leverages the availability of several building blocks available to the security engineer to deliver quantum-safe authentications. As described further herein, a mechanism for augmenting public-key protected identities and authentications (vulnerable to certain types of attacks) with symmetric-key authentication traces is provided. The disclosure provides three different ways to distribute symmetric keys: a) time-base protection, b) secure key-exchange mechanisms, and c) public with symmetric combinations.

The systems and methods described herein include a mechanism to provide quantum-safe authentication by combining different building blocks in a new approach. Specifically, the systems and methods include (a) deploying symmetric keys in a secure way (i.e., ahead of time, by using a quantum-safe KEM (Key Exchange Mechanism), or by using a physical layer key-exchange mechanism (e.g., quantum key distribution-QKD) to avoid the possibility of recovering pre-recorded traffic that can be deciphered at a later time), (b) using symmetric crypto combined with public-key crypto to provide quantum-safe authentications, and (c) using symmetric+asymmetric authentication traces to protect the certificate chain for safe certificate-chain validation even in a post-quantum scenario. In addition, the use of composite crypto could be optionally combined to provide support for mixed environment where devices can use a mix of post-quantum and classic algorithms.

When deploying (or deriving) new secrets to be delivered to the receiving entity, the identity manager needs to keep a link between the additional secret that is used in the authentication trace (the post-quantum pre-shared keys (PSK)-PQP) together with the identity of the recipient of this shared key.

Depending on how the keys are exchanged/generated, if the generation is one-directional (i.e., no shared Diffie-Helman like algorithm is used), the shared keys can be generated by a single master key. Specifically, the input to the calculation for the specific key is the Master Key (or multiple Master Keys), the certificate/identity for which the key is intended, and, eventually, configuration parameters (e.g., number of rounds). This allows the network authenticator to keep a small number of keys (easier to safely store and protect) and still be able to derive individual keys that are tied to specific identities.

For example, when deriving the PQP for entity A, the server can use one of the Master Keys (the only secret), the hash of the entity's A identity (e.g., a certificate or a public key)-public parameter, and the configuration (if any) parameters for the specific key derivation algorithm used (e.g., number of rounds or a hashing algorithm identifier that are used in Hash-Based Key Derivation functions). This mechanism is independent from the specific Key Derivation mechanism used and parameters.

One of the challenging issues when it comes to cryptography is maintaining the security of devices with different capabilities, some of which might not even be upgradeable. This lack of ability to upgrade can be due to software limitations (e.g., firmware or applications cannot be securely updated) or hardware limitations (e.g., crypto accelerators or secure elements).

Although composite cryptography cannot be used to secure non-quantum-safe authentications against the quantum threat by itself, in the case where entities and devices do not to support any post-quantum algorithm, a solution can be used to extend the lifetime of deployed identities.

When no other measures are possible, the symmetric keys can be time-bound delivered to well-identified entities before the currently used authentication mechanism becomes unsafe (e.g., because of the advancement in crypto analysis or quantum-computing). For example, the delivery of PQP can be considered safe if performed before the identity of the target entity becomes compromised/compromise-able (e.g., because of advancement in factorization against the RSA algorithm used for the entity's public key).

When devices have support for secure Key Exchange algorithms, but no support for secure (or possibly compromised) public-key signing algorithms, the PQPs can be securely transferred at a later time as long as the communication channel is not affected by an active Man in The Middle attack. Specifically, by not being able to alter (or inject) its own parameters for the key exchange, the PQP can securely land on the receiving entity and even if the entity has access to the recorded traffic, it cannot retrieve the value of the PQP and, therefore, cannot fully impersonate the legitimate entity.

After the initial deployment, an identity manager/network controller entity can decide to update the key at regular intervals by delivering new keys that are combined with the original one. For example, the identity manager/network controller can send a new key and optionally indicate the type of operation that the receiving entity needs to perform. An important principle to keep in mind that the security of the symmetric key depends entirely on the security of the initial seed (i.e., the initial PQP that was securely deployed).

By continuously updating the key, even if the original PQP was shared across different devices, the resulting symmetric key will be different after the entity is connected to the network—this allows us to continuously distinguish among entities that are sharing credentials (this is the core of another separate submission-chained authentications).

Figure 1:
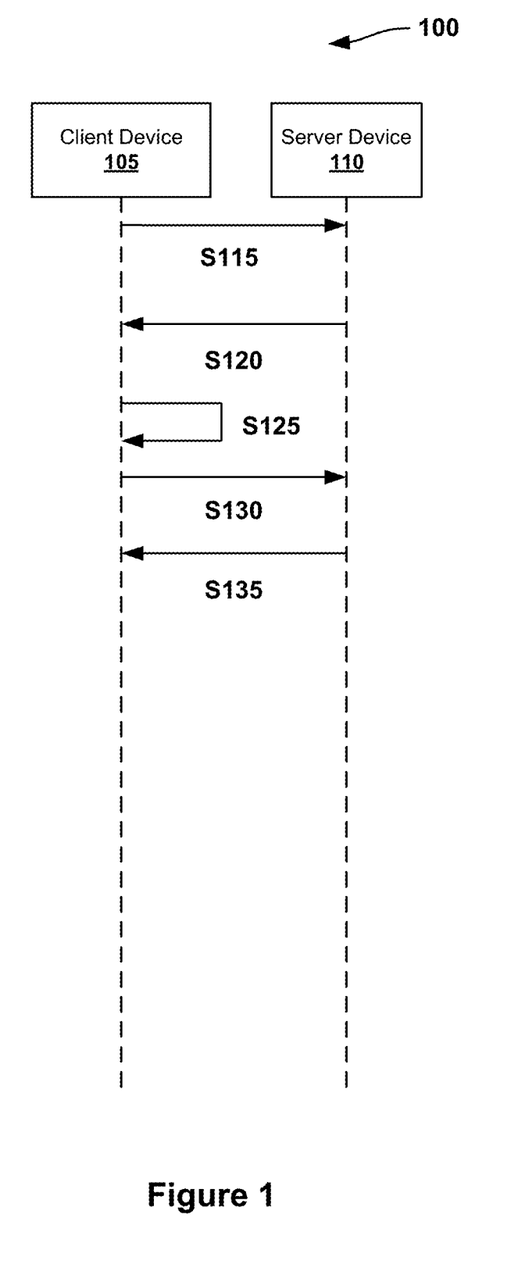
FIG. 1 illustrates a timing diagram of a process for the initial deployment of Post-Quantum Pre-shared keys (PQP) in accordance with at least one embodiment.

FIG. 1 illustrates a timing diagram of a process 100 for the initial deployment of Post-Quantum Pre-shared keys (PQP) in accordance with at least one embodiment.

Process 100 illustrates the Initial deployment of PQPs. One important aspect to highlight is the fact that the deployment of PQPs is symmetrical in the Server/Client paradigm. In fact, the deployment of PQPs from a Server 110 to a Client 105 can be mirrored in the opposite direction. In this case, the entity that is connecting to the server side 110 is the one generating the PQP and sending it. The Server Side 110 will have to use, in subsequent authentications, the PQP value to prove their identity. The Server Side 110 and Client Side 105 deployments of PQPs are two distinct process that can be optionally enabled and are independent from each other.

In the exemplary embodiment, the client device 105 transmits S115 an authentication request to the server 110. The authentication request includes a plurality of parameters. The server device 110 receives the request and generates a seed PQP for the client device 105. The server device 110 transmits S120 an authentication reply including parameters, the encrypted $PQP_{seed}$ and one or more seed operations to be performed on the $PQP_{Seed}$.

The client device 105 stores S125 the PQP. Then the client device 105 transmits S130 a hash of the PQP for validation. The client device 105 can also transmit an optional encrypted network PQP and one or more Seed Operations. The server 110 transmits S135 a hash of the Network PQP for validation purposes.

In this case, when the client 105 sends S115 an authentication request, the server 110 can generate (or derive) the seed PQP for the entity and send S120 it in the authentication reply (or by using an additional message) to the device 105 if, and only if, the authentication of the entity 105 was successful. The specified operation, in this case, is the initial Seed one.

The Client Side 105 decrypts the key S125 (or derives the key if the key exchange mechanism uses a Diffie-Hellman approach) and stores the key S125 in a secure storage. Optionally, the Client side 105 can send a confirmation of the stored value back to the network manager 110 (server side) by sending back a salted hash of the current PQP S130.

Optionally, the Client Side 105 can generate a PQP for the network that the network will have to use when the identity of the network could be compromised (e.g., because of an algorithm failure due to crypto analysis advances) and send it to the Server side.

Figure 2:
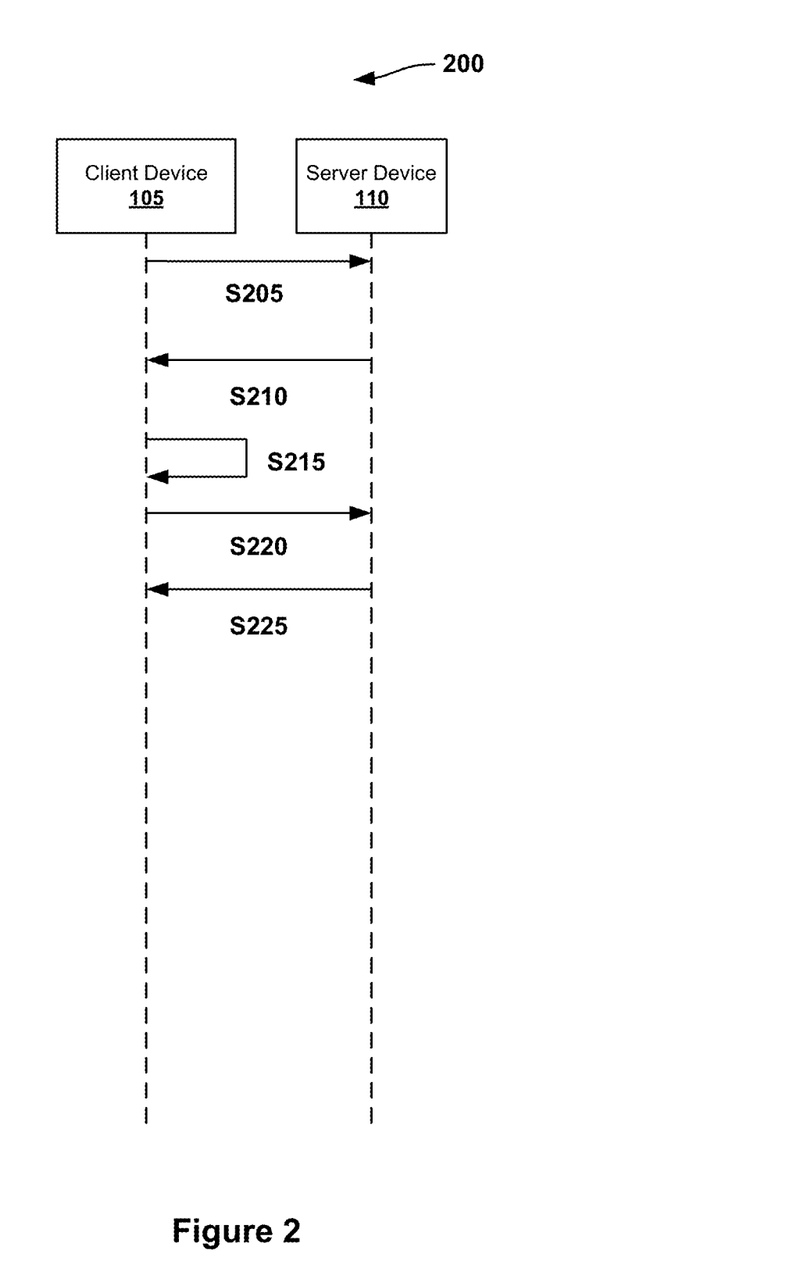
FIG. 2 illustrates a timing diagram of a process for performing secret PQP updates in accordance with at least one embodiment.

FIG. 2 illustrates a timing diagram of a process 200 for performing secret PQP updates in accordance with at least one embodiment.

After the initial deployment of PQPs, the network identity manager component (or the identity manager on the client side) might decide that they want to update the initial Seed to generate a new PQP. To do that, the entity generates another PQP as before, and when it sends it to the other party, it specified which type of operation should be applied to achieve the generated PQP.

In this case, derivation via Hash functions or other non-reversable combining operations can be applied. Reversable operations (e.g., XOR) are discouraged as they can lead to low-entropy or compromise-able keys (e.g., XOR with the same PQP would result in an all-zeros key).

In the message flow, only one side of the update is shown, however the operation, also in this case, is fully symmetrical and the two parts can happen independently.

In the exemplary embodiment, the client device 105 transmits S205 an authentication request including one or more parameters. The server device 110 determines an update to the PQP. The server device 110 transmits S210 an authentication reply, including one or more parameters, an encrypted version of the updated PQP and the operations to update the PQP.

The client device 105 updates the PQP with the provided operation and stores S215 the updated PQP. The client device 105 transmits S220 a hash of the PQP for validation. The server device 110 transmits S225 either a confirmation or validation error in response to the hash of the PQP.

Another technique that can be employed to generate and/or derive the same secret PQP at any time is to employ a One Time Password scheme. Typically, these key generation/derivation schemes employ the use of a set of initial values and a calculation that is time dependent. Therefore, for devices that can rely on a sufficiently good source of time (i.e., internal, or external) can employ these mechanisms to generate PQPs without the need to store the keys directly. The generation parameters for OTPs must be transferred securely-either by employing the mechanisms described herein this invention or any other secure mechanism that can be inline or out of band.

Figure 3A:
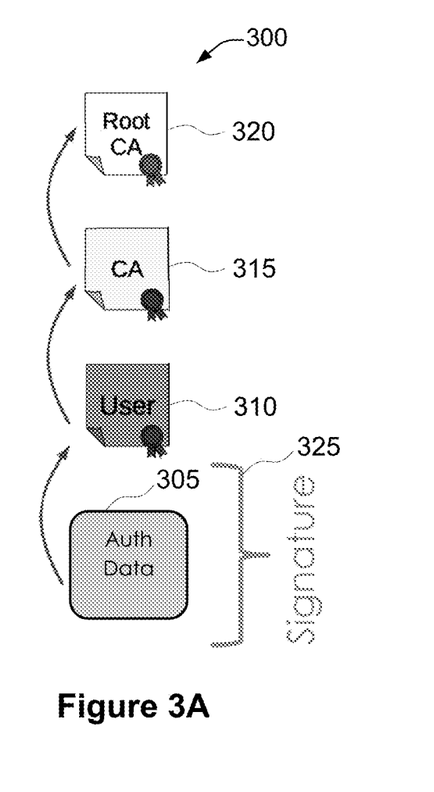
FIG. 3A illustrates a first authentication trace in accordance with at least one embodiment.
Figure 3B:
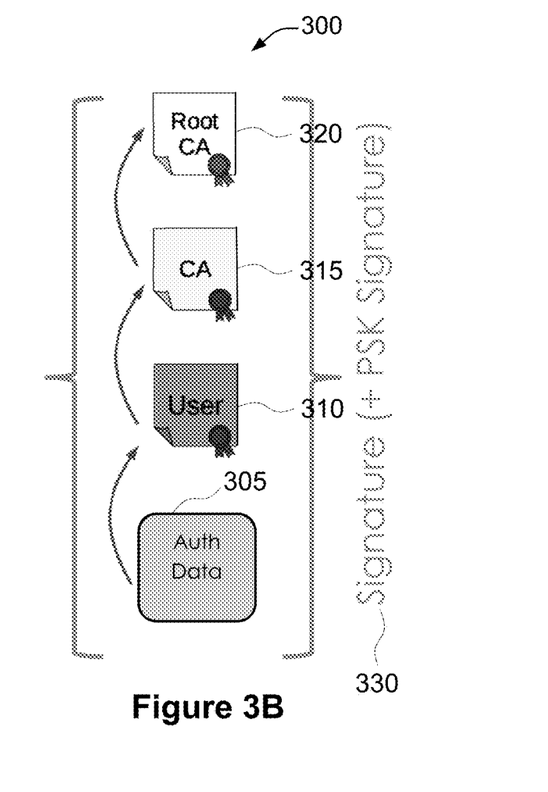
FIG. 3B illustrates a second authentication trace in accordance with at least one embodiment.

FIG. 3A illustrates a first authentication trace in accordance with at least one embodiment. FIG. 3B illustrates a second authentication trace in accordance with at least one embodiment.

The current capability of fielded devices that cannot be updated to support Post Quantum Algorithms (PQAs) can be analyzed to assist in securing those devices. There are several classes of quantum-safe algorithms that are available and how these algorithms can be leveraged, given today's hardware constraints, to provide quantum-safe authentications.

For constrained devices, the exemplary option is the use of pre-shared keys (PSKs) to allow for post-quantum safe authentications for the various identified use cases. This method as describes herein, accounts for their limitations and how to prepare them to provide protection against factorization of classic public-key schemes. In this scenario, the post-quantum PSK, namely the Post-Quantum Pre-shared key (PQP), is used to generate quantum-safe signatures and, in some cases, to also provide a "second factor" of authentication for the certificate chain when there is no support for any Post Quantum Algorithm (PQA), even for validation.

In the exemplary embodiment, generating combined signatures that can leverage different types of algorithms used to protect both the data (i.e., an authentication parameter, a nonce, an authentication message) together with the identity chain. The use of the combined signature is to also protect the identity chain-a process that is not usually needed. Specifically, while today signatures are typically produced over the data, and the combined signature can be used as a trusted identity, where the signatures in the certificates can be relied on to protect the identities' information (i.e., the entity's certificate, the issuer of the entity's certificate, etc.) as shown in FIGS. 3A and 3B.

FIG. 3A illustrates a typical authentication trace of an identity chain 300. In the identity chain 300, the authenticated data 305 is linked to the user 310, who is linked to the certificate authority (CA) 315, who is then linked to the root certificate authority 320. Of these, only the authenticated data 305 is protected by a signature 325.

In general, when digital signatures are used (or other PKI schemes), the signatures 325 are not calculated over the authenticated identities (certificates), which can leave them vulnerable to modification (i.e., if the algorithms fail, an attacker could re-calculate signatures correctly and change data in the identity certificates thus nullifying the trust in that identity chain 300).

FIG. 3B illustrates an enhanced authentication trace of the identity chain 300, wherein the signature 330 is calculated also on the identity chain 300. In this identity chain 300, the entire identity chain is protected by signatures (and potentially PSK signatures, rather than just the authentication data 305.

To generate quantum-safe signatures, entities can start combining the use of the PSK with their device private keys (e.g., RSA keys) to produce quantum-safe authentication data. Specifically, the use of RSA (or other vulnerable cryptography) provides the validation of the original identity information, along with the proof of possession of the identity-associated private key, while the PQP provides the cryptographically secure authentication.

Combining the PSK with the authentication process can be done in different ways. The PQP can be used to generate symmetric signatures that typically leverage encryption or hash algorithms. Examples of these algorithms are AES-256 or HMACs that leverage the SHA2 or SHA3 family of hashes. A hash-based key derivation function (HKDF) like the one described in [RFC 5869] can be used with the PQP to derive a message-specific key that is then used with an HMAC function to authenticate the messages.

In a first use case, private keys, certificates, and crypto capabilities cannot be updated. In this case, traditional crypto is relied on to perform the needed setup operations securely before the quantum threat is real. In a second use case, the requirement for time-safe deployment is removed. In this case, the devices' private keys cannot be updated, but their support for composite crypto and quantum-safe KEX algorithm can (e.g., via firmware updates).

In the first use case, the approach uses Immutable Devices and Quantum-Safe Traditional Authentications in DOCSIS. In this scenario, the entities and devices whose support for new algorithms cannot be updated, not even for validation-only operations (i.e., no support for private keys or signing). Because of these restrictions, traditional cryptography is leveraged to distribute per-device PSKs that can be leveraged for post-quantum authentications.

More specifically, using the DOCSIS protocol, the possibility to securely transfer (or derive) a common PSK between the operator's network and the device being authenticated (i.e., the cable modem or the R-PHY node) is introduced. Once the PQP is securely delivered to the device, this secret can stay dormant until needed for generating quantum-safe signatures. This PSK can be deployed as part of the initial registration of devices to the network, or it could be initiated at any time as long as the PQP is transferred securely as described herein.

One very important aspect of the solution is to make sure not only that the session parameters are properly authenticated via the quantum-safe signature, but that the certificate chain is protected against modifications by including it into the original signature. Assuming the PSK is secure, the relying party (e.g., the CCap Core or the CMTS) can trust both the signature and identity of the device because of the security of the PQP.

One potential limitation of this approach is related to the security of the PSK. Because the PSK has to be transferred or derived by using traditional cryptography, an attacker could potentially pre-record the device's traffic and then-when access to a quantum computer is obtained-get access to the PQP by breaking the classic KEX algorithm. The attacker would then be able to impersonate any device, even when using the PQP when generating signatures. Operators can mitigate this issue for a malicious attacker who is pre-recording DOCSIS traffic to analyze and decrypt it at a later time. Indeed, operators can deploy keys at random intervals or use procedures for combining new and old values (and/or replace them) at random times. An attacker would require knowledge of the whole history of the device connectivity to be able to attack its PQP.

In the second use case, the approach uses Partially Upgradeable Devices and Quantum-Safe Traditional Authentications in DOCSIS. In this scenario, when entities and devices can be updated to support new algorithms, but their private keys cannot (e.g., the keys are tied to secure elements that cannot be updated), more secure options can be adopted for transferring the PSK. This upgrade path might be the most common for the broadband industry given that the possibility to provide secure software updates is built into the DOCSIS protocol since its inception.

In this scenario, it is assumed that the devices have been updated to support composite crypto and a quantum safe KEX algorithm, but the devices themselves cannot update their own private keys. This further assumes that the root 320 and the intermediate CAs 315 have been deployed with a PQA algorithm alongside traditional ones.

To protect the PQP against a possible all-powerful adversary that can break the traditional cryptography, the PQP is shared by using a quantum safe KEX algorithm. The use of a quantum safe KEX algorithm guarantees that an adversary would not be able to have access to the PQP, even when pre-recording encrypted sessions. The use of traditional cryptography still provides the needed secure identity validation to make sure the PQP is shared across the right entities. Also, in this case, when generating authentication data, the certificate chain needs to be protected because the link between the intermediate CAs and the end-entity certificate is not yet protected via a PQP.

When the entity's certificate can be updated and signed by using a Post Quantum Algorithm or PQA (i.e., the CA 315 signs a new certificate for the entity that includes the original "traditional" key of the entity only, and it can be signed using all the keys in the CA's composite certificate), the need to sign the certificate chain with the PSK can be relaxed. In fact, because the links from the root to the end entity is already secured using a PQA, no additional use of the PSK to protect the devices or CAs' identities is needed.

Besides the use of new key exchange algorithms to protect the transfer of the PQP, QKD can also be leveraged for this purpose. Specifically, symmetric keys are quantum-securely delivered over fiber-optic or free-space links. In these embodiments, the optically connected device (e.g., an RPD, an ONU, etc.) or entity implements the receiver while the more expensive QKD transmitter implements the sender (e.g., server-side of the connection). Classical algorithms (or the use of the symmetric key) can be used to protect the ancillary information for the transferred key (sender authentication, etc.) that can be used by the receiver to validate the received bits.

This provides two important aspects. The first aspect is the use of asymmetric interfaces to lower the cost of needed interfaces. This is aspect can be critical for a deployment infrastructure where the symmetry of the fiber connectivity is not needed and, instead, an asymmetry is introduced to lower the costs of deployment.

Independently from the first aspect, as an alternative to the procedures described earlier, quantum-safe algorithms (e.g., like BB84) can be leveraged to distribute the needed PQPs. Because of the physical limitations of the media (i.e., requires a quantum observable to be detected like polarization or spin), the use of QKD for PQP distribution is limited to fiber or free space.

The security of both classical and post-quantum algorithms for key exchange and authentication is based on the computational complexity of intractable mathematical problems. Post-quantum algorithms have significantly improved security compared with their classical counterparts but eventually are still subject to the challenges from the ever-growing power of quantum computers. On the other hand, QKD offers provable security guaranteed by the laws of quantum mechanics.

In this disclosure, the security of public key infrastructure using quantum key distribution (QKD) is enhanced to deliver the pre-shared keys for quantum-safe authentications. These pre-shared keys could be used by either classical or post-quantum algorithms for quantum-proof security. At this point in time, point-to-point QKD for long-haul and core networks have received intensive research interest via either optical fibers or satellite relays. However, how to deliver the quantum keys to end users in broadband access networks, especially for point-to-multipoint topologies, is an important step. In this disclosure, QKD is leveraged for securely distributing the pre-shared keys.

Figure 4A:
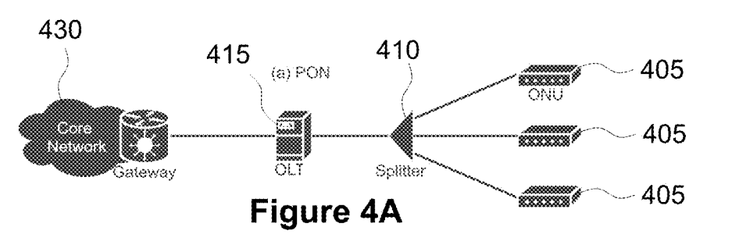
FIGS. 4A-4C illustrate a plurality of diagrams of broadband access networks in accordance with at least one embodiment.
Figure 4B:
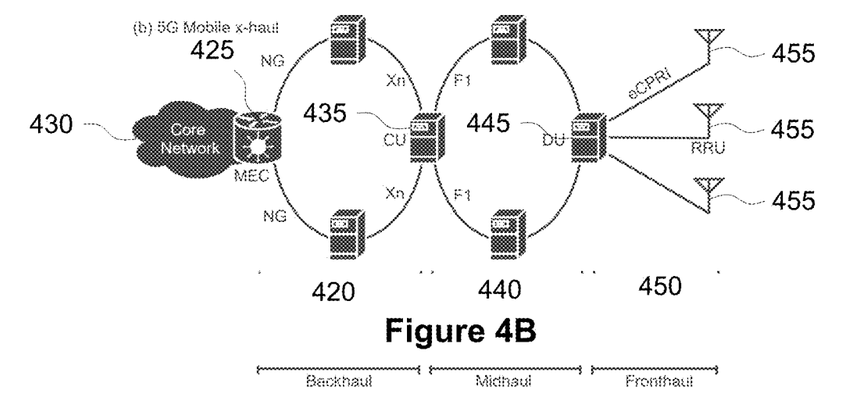
Figure 4C:
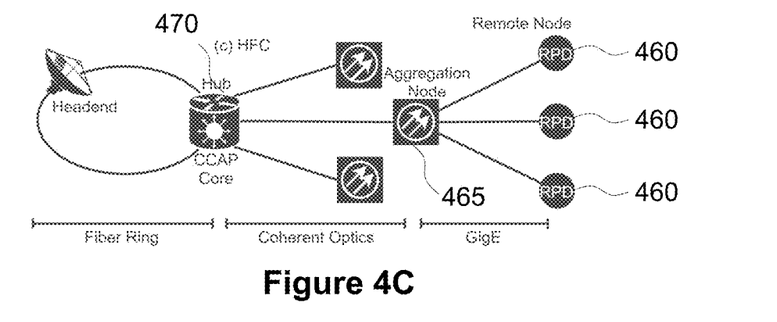

FIGS. 4A-4C illustrate a plurality of diagrams of broadband access networks in accordance with at least one embodiment. FIG. 4A illustrates a passive optical network (PON). FIG. 4B illustrates mobile x-haul networks. FIG. 4C illustrates hybrid fiber coaxial (HFC) networks.

FIG. 4A shows the architecture of a time-division-multiplexing (TDM) PON. The optical network units (ONUs) 405 are connected to an optical line terminal (OLT) 410 via a passive optical splitter 415. For downstream, the signal is broadcasted from the OLT 410 to all ONUs 405. For upstream, the TDM technique can be exploited to control the access of each ONU 405.

FIG. 4B shows the 5G mobile x-haul networks, including mobile backhaul 420 from mobile edge computing (MEC) 425 in the core network 430 to central units (CU) 435, midhaul 440 from CUs 435 to distributed units (DU) 445 and fronthaul 450 from DUs 445 to remote radio units (RRU) 455. According to 3GPP, the backhaul 420 and midhaul 440 segments utilize ring or mesh topology. The fronthaul 450 segment uses star or tree architecture.

FIG. 4C shows the architecture of HFC networks. Distributed access architecture (DAA) is enabled in recent years by fiber deep migration and remote PHY technology. The fiber distribution plant is upgraded from analog to digital, and deployed from the hub 470, via aggregation nodes 465, to remote fiber nodes 460. The PHY layer chips for modulation/demodulation of OFDM/QAM signals are moved from the cable modem termination system (CMTS) to remote nodes, so that the legacy CMTS in hub is split into a converged cable access platform (CCAP) core in the hub 470 and remote PHY devices (RPDs) 460 at remote nodes. With remote PHY technology, the baseband data of DOCSIS signals is delivered over digital fibers from the hub 470 to remote nodes 460, where RPDs synthesize the analog DOCSIS signals, upconvert them to radio frequencies and feed them to the coaxial cables. Since the fiber plant penetrates deeper and gets closer to end users, the length of coaxial cable plant becomes shorter and no RF amplifier is needed after remote nodes 460. This is why DAA is also called N+0 architecture.

As the last segment of networks, broadband access networks are of interest because they are not only the bottlenecks of user capacity, but also the most vulnerable segment of data security, where most eavesdropping and cyberattacks take place. For example, PON utilizes a tree architecture and broadcasts the downstream signals to all ONUs 405. Each ONU 405 can eavesdrop the downstream traffic of its neighbors without being noticed. The eavesdropper can know the MAC addresses and logic link identifications (LLIDs) of the neighbors and infer their traffic type and amount. The downstream multiple-point-control protocol (MPCP) messages also reveals the upstream traffic characteristics of neighbor ONUs 405. If there is a reflection or scattering point at the optical splitter 415 or in the feeder fiber, the eavesdropper can even access the upstream data of neighbors.

As the last network segment to the end users, access networks are quite cost sensitive, where no dark fiber is available, and it is cost-prohibitive to deploy new fibers for QKD purpose. Moreover, to deliver the keys to end users, popular point-to-point (P2P) QKD implementations will not work since most access networks feature fiber deficiency and point-to-multipoint (P2MP) topology, where P2MP QKD has to be deployed in the existing fiber plant and coexist with classical channels.

Since PON, mobile x-haul, and HFC networks all share similar network topologies, without loss of generality, PON can be focuses on, but the following applies to all three. When multiplexing quantum and classical channels in a shared fiber plant infrastructure, a challenge is the interference from the classical channels to quantum channels caused by Raman scattering noise. To avoid interference, we propose two deployment strategies to multiplex quantum and classical channels in either time or wavelength domain.

Figure 5A:
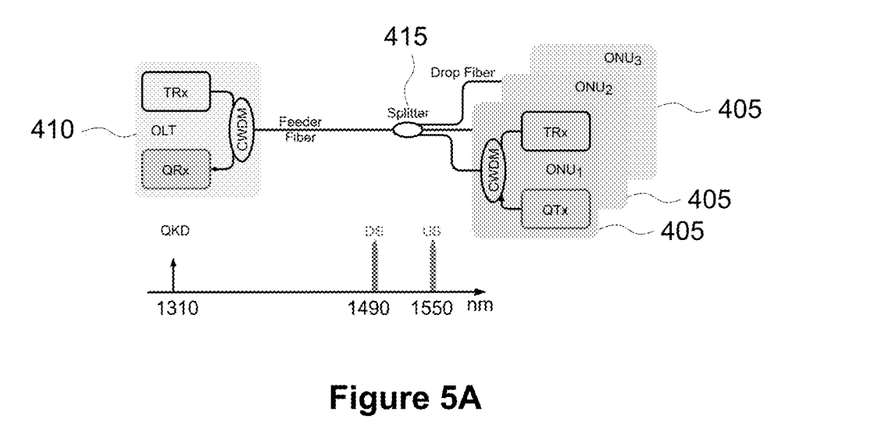
FIGS. 5A and 5B illustrate multiplexing quantum and classical channels in a passive only network as shown in FIG. 4A.

FIG. 5A illustrates a time-division-multiplexing (TDM)-PON with integrated QKD channels. Since weak coherent pulses are used as the single-photon source, QKD transmitter (QTx) could be implemented with off-the-shelf commercial components. On the other hand, the quantum receiver (QRx) is the most expensive device in a QKD system due to the single-photon detectors (SPDs). To reduce the overall system cost, upstream QKD transmission is preferred, with low-cost QTxs located in ONUs 405 (shown in FIG. 4A), and the expensive QRx in OLT 410 (shown in FIG. 4A) shared among multiple ONUs 405. Dedicated time slots are assigned to each ONU 405 for quantum and classical channels using TDM technology, and each ONU 405 exchanges individual keys with the OLT 410. At any given time, the QRx only receives photons from one QTx. The quantum channel is at 1310 nm. Classical downstream (DS) and upstream (US) channels are at 1490 nm and 1550 nm respectively, far away from the O-band to reduce Raman scattering noise. In ONUs 405 and OLT 410, a coarse wavelength-division multiplexer (CWDM) is used to separate/combine classical and quantum channels.

Figure 5B:
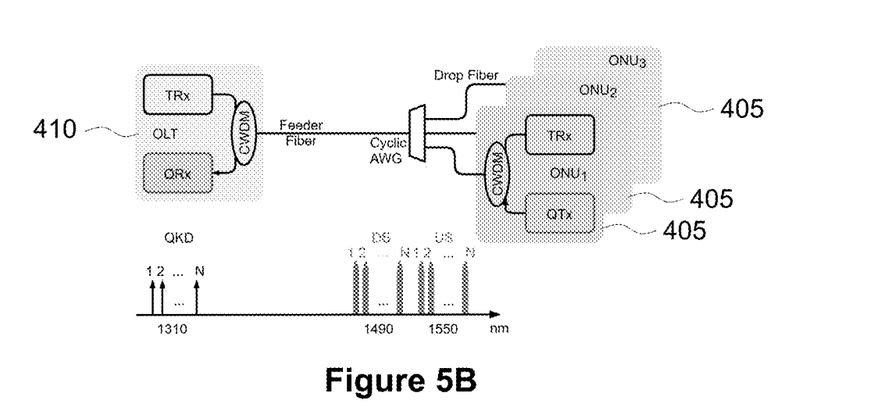

FIG. 5B illustrates the architecture of a wavelength-division-multiplexing (WDM)-PON with integrated QKD channels. Each ONU 405 (shown in FIG. 4A) uses three wavelengths in O, S, and C bands for quantum, classical downstream, and upstream channels respectively. They are multiplexed by a CWDM and fed to a drop fiber. All wavelengths coming from the drop fibers of all ONUs 405 are bundled together by a cyclic arrayed waveguide grating (AWG), then transmitted via a feeder fiber to the OLT 410. The cyclic AWG can perform wavelength multiplexing in O, S, and C bands simultaneously. With N users, in the feeder fiber, there are N wavelengths for quantum channels, and 2N wavelengths for classical downstream/upstream channels. At OLT 410, a CWDM first separates the groups of wavelengths and in each group, an AWG further separates the channels for each user. Compared with TDM-PON, the passive power splitter is replaced by CWDMs and AWGs, which reduces the channel loss and the fiber distance can be increased.

While the disclosure up to this point has been described in the context of entity validations. However, the ideas contained in this disclosure can apply generally to any identity system that leverage a security mechanism (like "classical" public key algorithms) to provide scalable identities that chain to a trusted one.

Typical example of such systems are PKIs like the X.509 PKI or PGP system. The core of these systems relies on the use of multiple signatures (or authentications) to anchor identities to a top-level or otherwise trusted identity. In the case of X.509 PKIs, this identity can be the Root CA 320 (shown in FIG. 3A). In the case of PGP system, this identity can be the Key Signing Key that is trusted by the user.

In all of these systems, the following elements can be identified, including a Trusted Identity (Trust Anchor), a Chain of Authentications that extend the trust to other identities, and Authentications (Signatures) performed on the Data. The systems and methods described herein augment this paradigm by introducing the use of a second authentication (via different algorithms) and by extending the Authentications (Signatures) to also cover the chain of authentications. This approach provides a mechanism to continue to use deployed identities (e.g., RSA certificates) in a secure fashion even when the original algorithm is completely broken.

When entities have the possibility to use identities associated with safe algorithms (e.g., digital certificates that use post-quantum public key algorithms), they might be issued a certificate from their current "classic" infrastructure. That means that, although the signatures generated by the entity are safe, the identity associated with that signature is not. In other words, the link between the vulnerable identity (i.e., the RSA-protected certificate) and the signature on the authentication data can be easily broken. To address this issue, the use of PQPs (securely transferred) can be employed to protect the chain of identities.

Differently from the previous case, though, the entity can directly sign the identity chain with its own credentials and the PQP can be used to generate a verifiable token that is included in the signature and can be optionally excluded from the signature generation process (since the security is provided by the entity's signature that is, in this case, safe).

This disclosure can be applied to DOCSIS. In BPI+ Version 2, because of the use of the Cryptographic Message Syntax (CMS) [RFC 5652], combining PSKs with DOCSIS authentication could also be used to provide key encapsulation capabilities for delivering authorization keys via a quantum-safe mechanism [RFC 8696]. For previous versions of DOCSIS, or where BPI+V2 is not supported because direct RSA encryption of the authorization key is used, additional changes to the protocol messages might also be required.

802.1x architectures make use of the EAP layer to deliver different authentication mechanisms. Among these mechanisms, there are many that use public keys and/or certificates. Examples of these are EAP-TLS, EAP-TTLS, EAP-TEAP, EAP-FAST, etc. All of these mechanisms can be augmented to support the use of PQPs to augment the authentication traces as described in this invention. In this setting, the delivery of PQPs is done by using TLS extensions that can carry the needed parameters.

3GPP networks do not currently use Public Keys or Digital Certificates to authenticate entities and networks, however the cryptography in use today is considered vulnerable in the future, should an efficient implementation of the Grover's algorithm be available.

The systems and methods described herein can be applied to 3GPP authentication traces by introducing the use of PQPs that are used together with the AKA credentials from the USIM. The signature from the PQP can be generated by using the techniques described in this invention and is transferred across the two entities by using extensions in the authentication request and reply messages. The additional fields carry the needed information for authenticating the data and identity of the communicating parties (e.g., the encrypted PQP or updates together with the optional key operation to perform).

In recently released versions of the 3GPP specifications, the use of Public Keys is introduced to protect network-originated messages. This systems and methods described herein can be applied to protecting the network's public-key signatures.

In the Wi-Fi world, a typical authentication pattern is where the Access Point is provided with some trusted identity (e.g., certificate) and the client uses symmetric secrets to prove their identity. The environment also supports authentication for the client via Public Key and Certificates (e.g., via the EAP layer). The systems and methods described herein can be applied to the Wi-Fi environment where the same authentication issues are identified. In addition to this option, the Wi-Fi alliance also introduced the Easy Connect protocol that is aimed at providing easy provisioning of credentials to devices. Because the Easy Connect protocol itself uses Public Keys to authenticate network and devices, the Easy Connect protocol can be used to also transfer the additional symmetric secrets to devices.

The system makes use of the pre-quantum keys and key exchanges to provide protection for systems that might not be able to update to the post-quantum cryptography. Moreover, the system allows for updating those keys to keep them secure. These features can be supported in network topologies where devices tend to authenticate always to the same network device (like a CMTS) after the initial registration (i.e., Cable or Home networks). This approach can also be applied to any access networks-DOCSIS, 3gpp, Wi-Fi, etc.

The systems and methods described herein are also compatible with additional key technologies, such as chained authentications as described in co-pending U.S. patent application Ser. No. 17/365,659, filed Jul. 1, 2021, the contents of which are fully incorporated by reference. Furthermore, the systems and methods described herein can also be used with the hybrid/composite key structures described in co-pending U.S. patent application Ser. No. 16/537,380, filed Aug. 9, 2021, the contents of which are fully incorporated by reference.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., time variant parameters, digital signatures, certificates, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

Furthermore, the embodiments described herein improve upon existing technologies, and improve the functionality of computers, by more reliably protecting the integrity of broadcast messages and timestamps at the server-side, and by further enabling the easier and more efficient verification of a received broadcast message at the client-side. The present embodiments therefore improve the speed, efficiency, and reliability in which such determinations and processor analyses may be performed. Due to these improvements, the aspects described herein address computer-related issues that significantly improve the security of broadcasting messages in comparison with conventional techniques. Thus, the aspects herein may be seen to also address computer-related issues such as communication security between electronic computing devices or systems, for example.

Exemplary embodiments of systems and methods for broadcast messaging protection are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A server device for authenticating client devices on a communication network, comprising:
   a transceiver configured for operable communication with at least one client device of the communication network;
   a processor including a memory configured to store computer-executable instructions, which, when executed by the processor, cause the server device to:
      receive an authentication request from a client device, wherein the authentication request is received prior to a transition to post-quantum cryptography;
      authenticate the client device based upon the authentication request;
      if the client device is authenticated, generate a seed for a first post quantum key for the client device;
      if the client device is authenticated, encrypt the seed for the first post quantum key;
      if the client device is authenticated, transmit, to the client device, an authentication reply including the encrypted seed for the first post quantum key and one or more operations to be performed on the seed for first post quantum key to generate the first post quantum key, wherein the authentication reply is transmitted prior to a transition to post-quantum cryptography;
      receive a hash of the first post quantum key from the client device, wherein the client device decrypted the seed and performed the one or more operations on the seed to generate the first post quantum key prior to generating the hash of the first post quantum key; and
      validate the first post quantum key based upon the hash of the first post quantum key.

2. The server device of claim 1, wherein the authentication reply also includes at least one non-reversible operation for the client device to perform on the seed of the first post quantum key to generate the first post quantum key.

3. The server device of claim 1, wherein the authentication reply further includes a hash of a network key for validation purposes.

4. The server device of claim 1, wherein the server device is further programmed to:
   receive an encrypted network key from the client device;
   decrypt and store the network key;
   generate a hash of the network key; and
   transmit the hash of the network key to the client device for validation.

5. The server device of claim 4, wherein the server device is further programmed to:
   receive at least one operation with the encrypted network key; and
   perform the at least one operation on the encrypted network key to generate the network key.

6. The server device of claim 1, wherein the seed for the first post quantum key is transmitted prior to availability of post-quantum cryptography.

7. The server device of claim 1, wherein the server device is further programmed to:
   determine an update to the first post quantum key;
   transmit the update to the first post quantum key to the client device;
   receive a hash of the updated first post quantum key from the client device; and
   validate the updated first post quantum key based on the hash of the updated first post quantum key.

8. The server device of claim 7, wherein the update includes one or more non-reversible operations to be performed on the first post quantum key to generate the updated first post quantum key.

9. The server device of claim 7, wherein the update includes an update key to be applied to the first post quantum key to generate the updated first post quantum key.

10. A server device for authenticating client devices on a communication network, comprising:
    a transceiver configured for operable communication with at least one client device of the communication network;
    a processor including a memory configured to store computer-executable instructions, which, when executed by the processor, cause the server device to:
       receive an authentication request from a client device, wherein the client device stores a first post quantum key, wherein the authentication request is received prior to a transition to post-quantum cryptography;
       authenticate the client device based upon the authentication request;
       if the client device is authenticated, determine an update to the first post quantum key;
       if the client device is authenticated, encrypt the update for the first post quantum key;
       if the client device is authenticated, transmit, to the client device, an authentication reply including the encrypted update to the first post quantum key and one or more operations to be performed on the update for first post quantum key and the first post quantum key to generate the updated first post quantum key, wherein the authentication reply is transmitted prior to a transition to post-quantum cryptography;
       receive a hash of the updated first post quantum key from the client device, wherein the client device decrypted the update for the first post quantum key and performed the one or more operations on the update for the first post quantum key and the first post quantum key prior to generating the hash of the updated first post quantum key; and
       validate the updated first post quantum key based on the hash of the updated first post quantum key.

11. The server device of claim 10, wherein the update includes one or more non-reversible operations to be performed on the first post quantum key to generate the updated first post quantum key.

12. The server device of claim 10, wherein the update includes an update key to be applied to the first post quantum key to generate the updated first post quantum key.

13. The server device of claim 10, wherein the update for the first post quantum key further includes an encrypted version of the updated first post quantum key.

14. The server device of claim 10, wherein the server device is further programmed to:
    generate a seed for the first post quantum key for the client device;
    transmit the seed for the first post quantum key to the client device;
    receive a hash of the first post quantum key from the client device; and validate the first post quantum key based on the hash of the first post quantum key.

15. The server device of claim 14, wherein the server device is further programmed to transmit, to the client device, at least one operation for the client device to perform on the seed of the first post quantum key to generate the first post quantum key.

16. The server device of claim 14, wherein the seed for the first post quantum key is transmitted prior to availability of post-quantum cryptography.

17. A client device for communicating on a communication network, comprising:
   a transceiver configured for operable communication with at least one server device of the communication network;
   a processor including a memory configured to store computer-executable instructions, which, when executed by the processor, cause the server device to:
      transmit an authentication request to a server device, wherein the authentication request is transmitted prior to a transition to post-quantum cryptography;
      receive an authentication reply including an encrypted seed for a first post quantum key and one or more operations to be performed on the seed for first post quantum key to generate the first post quantum key from the server device, wherein the authentication reply is received prior to a transition to post-quantum cryptography;
      decrypt the seed for the first post quantum key;
      perform the one or more operations on the seed of the first post quantum key to generate the first post quantum key;
      store the first post quantum key;
      generate a hash of the first post quantum key; and
      transmit the hash of the first post quantum key for validation to the server device.

18. The client device of claim 17, wherein the client device is further programmed to:
   receive, from the server device, at least one non-reversible operation for the client device to perform on the seed of the first post quantum key to generate the first post quantum key; and
   generate the first post quantum key by performing the at least one non-reversible operation on the seed.

19. The client device of claim 17, wherein the authentication reply further includes a hash of a network key for validation purposes.

20. The client device of claim 17, wherein the client device is further programmed to:
   transmit an encrypted network key to the server device;
   receive a hash of a network key from the server device, wherein the network key is based on the encrypted network key; and
   validate the network key based on the hash.

* * * * *